(12) United States Patent
Kamiya et al.

(10) Patent No.: US 8,794,477 B2
(45) Date of Patent: Aug. 5, 2014

(54) SEALING MATERIAL FOR HIGH-PRESSURE HYDROGEN CONTAINER, AND HIGH-PRESSURE HYDROGEN CONTAINER

(75) Inventors: Itsuo Kamiya, Toyota (JP); Rentaro Mori, Kasugai (JP); Kazuhiko Kobiki, Arida (JP); Masashi Hamakubo, Arida (JP)

(73) Assignees: Toyota Jidosha Kabushiki Kaisha, Toyota-shi, Aichi-ken (JP); Mitsubishi Cable Industries, Ltd., Tokyo (JP)

( * ) Notice: Subject to any disclaimer, the term of this patent is extended or adjusted under 35 U.S.C. 154(b) by 821 days.

(21) Appl. No.: 12/525,574

(22) PCT Filed: Feb. 8, 2008

(86) PCT No.: PCT/JP2008/052590
§ 371 (c)(1),
(2), (4) Date: Aug. 3, 2009

(87) PCT Pub. No.: WO2008/099941
PCT Pub. Date: Aug. 21, 2008

(65) Prior Publication Data
US 2010/0102067 A1    Apr. 29, 2010

(30) Foreign Application Priority Data
Feb. 8, 2007   (JP) ................................. 2007-029592

(51) Int. Cl.
*F17C 1/00*    (2006.01)

(52) U.S. Cl.
USPC ........................................ 220/581; 220/562

(58) Field of Classification Search
USPC ........................ 220/581, 586, 562; 524/502
See application file for complete search history.

(56) References Cited

U.S. PATENT DOCUMENTS

| | | | |
|---|---|---|---|
| 2,723,966 A | 11/1955 | D.C. Youngs | |
| 2,854,698 A | 10/1958 | D.C. Youngs | |
| 3,274,153 A | 9/1966 | Hyde et al. | |
| 3,508,677 A | 4/1970 | Laibson et al. | |
| 4,981,899 A * | 1/1991 | Nakamura et al. | 524/493 |

(Continued)

FOREIGN PATENT DOCUMENTS

| | | |
|---|---|---|
| DE | 1 004 374 | 11/1954 |
| DE | 1 156 981 | 4/1958 |

(Continued)

OTHER PUBLICATIONS

R. Eshel, "Prediction of Extrusion Failures of O-Ring Seals©", ASLE Transactions, vol. 27, No. 4, pp. 332-340 (1984).

(Continued)

*Primary Examiner* — Jeffrey Allen
(74) *Attorney, Agent, or Firm* — Finnegan, Henderson, Farabow, Garrett & Dunner, LLP

(57) ABSTRACT

According to the present invention, a sealing material for a high-pressure hydrogen container, which mainly comprises a silicone rubber composed of a dimethyl siloxane segment, a methyl vinyl siloxane segment, and a diphenyl siloxane segment, and a high-pressure hydrogen container using the sealing material are provided. In order to seal a high-pressure hydrogen container (CHG tank) system for fuel cell vehicles with an elastomer, the elastomer has (1): excellent durability in a variable pressure environment of high-pressure hydrogen; and (2): excellent sag resistance in low-temperature to high-temperature environments, and thus the significant technical objectives (1) and (2) have been achieved.

5 Claims, 3 Drawing Sheets

(56) References Cited

U.S. PATENT DOCUMENTS

| | | | |
|---|---|---|---|
| 5,786,414 | A | 7/1998 | Chikuni et al. |
| 5,938,209 | A | 8/1999 | Sirosh et al. |
| 2003/0119975 | A1 | 6/2003 | Fujiki et al. |
| 2004/0182869 | A1* | 9/2004 | Kubo et al. ............... 220/581 |
| 2009/0194545 | A1 | 8/2009 | Kamiya et al. |

FOREIGN PATENT DOCUMENTS

| | | |
|---|---|---|
| DE | 1 301 137 | 4/1963 |
| DE | 11 2007 002 020 | 7/2009 |
| GB | 765385 | 1/1957 |
| GB | 819844 | 9/1959 |
| JP | 5-39896 | 2/1993 |
| JP | 5-39898 | 2/1993 |
| JP | 5-47569 | 2/1993 |
| JP | 5-64343 | 3/1993 |
| JP | 6-93186 | 4/1994 |
| JP | 6-93249 | 4/1994 |
| JP | 9-177976 | 7/1997 |
| JP | 9-227779 | 9/1997 |
| JP | 9-242990 | 9/1997 |
| JP | 9-264427 | 10/1997 |
| JP | 10-96500 | 4/1998 |
| JP | 10-141594 | 5/1998 |
| JP | 10-182882 | 7/1998 |
| JP | 10-325465 | 12/1998 |
| JP | 11-512649 | 11/1999 |
| JP | 2002-371161 | 12/2002 |
| JP | 2003-35829 | 2/2003 |
| JP | 2003-113309 | 4/2003 |
| JP | 2003-279000 | 10/2003 |
| JP | 2003-336795 | 11/2003 |
| JP | 2004-2914 | 1/2004 |
| JP | 2004-76870 | 3/2004 |
| JP | 2004-116329 | 4/2004 |
| JP | 2005-158762 | 6/2005 |
| JP | 2005-265138 | 9/2005 |
| JP | 2005-307015 | 11/2005 |

OTHER PUBLICATIONS

P. Chen et al., "A Unique Self-Tighten High Pressure Seal Device," PVP-vol. 255, Power Plant Equipment Design: Bolted Joints, Pumps, Valves, Pipe and Duct Supports, pp. 93-95 (1993).

"Nozzle/Receptacle (Fluid Coupling) for Supply and Fueling of Compressed Hydrogen to Fuel Cell Vehicles," The Piping Engineering (*Heiken Gijutsu*), vol. 45, No. 9, pp. 76-79 (2003).

"Sealing Mechanism for High-Pressure Fluid," Petroleum and Petroleum Chemistry (*Sekiyu to Sekiyu Kagaku*), vol. 18, No. 9, pp. 42-47 (1974).

Machine Design, Fluid Power Reference Issue, "Section 5: Fluid Seals and Packings," pp. 212-220 (1976).

H.H. Buchter, "Accurate Design Analysis of Flange Joints," Petroleum Division of the American Society of Mechanical Engineers, Joint Petroleum Mechanical Engineering and Pressure Vessels and Piping Conference, Mexico City, Mexico, pp. 1-9 (1976).

"Stainless-Steel O Rings," Hydraulics & Pneumatics (*Yuatsu Gijutsu*), vol. 16, No. 2, pp. 88-91 and 98-99 (1977).

C. McGowan et al., "TFE Seal with Stainless Lip Withstands $H_2$ to 1000 psi," Chemical Processing, vol. 40, No. 6, p. 130 (1977).

German Office Action for German Appl. No. 11 2008 000 192.8 dated Mar. 3, 2011.

Xiang, X. et al., "Synthesis and Property of Tri-block Silicone Copolymer," Silicone Material, vol. 15(6), 2001, pp. 12-14.

* cited by examiner

SEALING MATERIAL FOR HIGH-PRESSURE HYDROGEN CONTAINER, AND HIGH-PRESSURE HYDROGEN CONTAINER

CROSS-REFERENCE TO RELATED APPLICATIONS

This application is a national phase application of International Application No. PCT/JP2008/052590, filed Feb. 8, 2008, and claims the priority of Japanese Application No. 2007-029592, filed Feb. 8, 2007, the contents of both of which are incorporated herein by reference.

TECHNICAL FIELD

The present invention relates to a high-strength sealing material that is obtained without significant impairment of the low-temperature properties of the material. Also, the present invention relates to a high-pressure hydrogen container that is a highly suitable vehicular container for supplying hydrogen to fuel cells.

BACKGROUND ART

In recent years, gas tanks (gas cylinders) that store hydrogen or natural gas serving as fuel for electric power generation have been used in automobiles, houses, transport machinery, and the like.

For instance, polymer electrolyte fuel cells have been gaining attention as a power source for automobiles. When such fuel cells are used for electric power generation, an electrochemical reaction is induced by supplying a gas fuel (e.g., hydrogen gas) to a gas diffusion electrode layer provided on one side of each fuel cell and supplying an oxidant gas (e.g., air containing oxygen) to a gas diffusion electrode layer provided on the other side. Upon such electric power generation, nontoxic water is exclusively produced. Thus, the above fuel cells have been gaining attention from viewpoints of environmental influences and use efficiency.

In order to continuously supply a gas fuel such as hydrogen gas to an automobile equipped with the above fuel cells, a gas fuel is stored in an in-vehicle gas tank. Examples of in-vehicle hydrogen gas tanks that have been examined include a gas tank that stores compressed hydrogen and a hydrogen-storing gas tank that stores hydrogen in a state of absorption in metal hydride (MH).

Among them, a CFRP (carbon fiber-reinforced plastic) tank has been examined for use as an in-vehicle gas tank that stores compressed hydrogen. A CFRP tank is structured such that a liner layer (inner shell) that maintains airtight properties of the tank is formed inside a layer (outer shell: fiber-reinforced layer) comprising a carbon fiber-reinforced plastic (CFRP material). Such CFRP tank has strength greater than that of a tank made of a usual type of plastic and is excellent in pressure resistance, and therefore it is preferably used as a gas fuel tank.

As an aside, a high-pressure hydrogen container (compressed hydrogen gas tank: CHG tank) system in a fuel-cell vehicle is loaded with high-pressure hydrogen gas (between 35 MPa and 75 MPa or more). In such case, in terms of the degree of freedom of sealing material design, sealing with the use of elastomer is more desirable than sealing with the use of metal material. In addition, the development of material that has durability against filling and discharge of a high-pressure hydrogen gas at high frequency is awaited. Hydrogen gas incorporated into an elastomer at high pressures tends to diffuse outside the elastomer under reduced pressure so that it is necessary for such material to be durable in variable pressure environments. Further, it is necessary for such material to be durable in variable temperature environments (approximately between a low temperature of −70° C. and a high temperature of 80° C.).

There are a variety of known sealing materials that are generally used. For instance, JP Patent Publication (Kokai) No. 10-182882 A (1998) discloses a rubber composition comprising a specific hydrogenated nitrile rubber (a) to which a specific carbon black (b) has been added, such carbon black having specific surface area, compressed DBP oil absorption amount, tint strength, ratio of specific surface area for nitrogen adsorption to iodine adsorption amount, and electron-microscopically-observed average particle size. This is because, when conventional materials obtained by adding silicon dioxide to hydrogenated nitrile rubber are used for molding of sealing members for car air-conditioner compressors, the sealing members obtained by vulcanization molding of such materials are not satisfactory in terms of fluorohydrocarbon-resistant properties (blister resistance) and wear resistance (necessary for movable sealing members) under high temperature conditions. The reference also describes that a product obtained by vulcanization molding of such rubber composition, which is used for sealing members and the like for car air-conditioner compressors, is excellent in blister resistance, wear resistance, and the like.

In addition, in Plast Rubber Compos Process Appl (JIN: D0988B; ISSN: 0959-8111) VOL. 22, No. 3, an elastomer was theoretically analyzed in terms of liquid absorption, high-pressure permeation, and rapid disintegration (explosive disintegration), with the title of "Durability of TFE/P and other fluorinated elastomers when used in stringent high-pressure environments for sealing purposes." The obtained results were further confirmed by experimentation. The reference also describes that sealing materials tend to deteriorate due to physical influences rather than chemical reactions. In addition, the reference introduces, as a fluorinated elastomer, an elastomer (explosion-proof elastomer) that is excellent in terms of durability against rapid disintegration (explosive disintegration).

However, an explosion-proof elastomer is significantly inferior in "sag resistance," which is important for sealing duration performance, and in "low-temperature properties (retraction properties)," which are important in an environment in which a high-pressure hydrogen tank for fuel cells is used. These issues have been problematic.

It is considered that the above problems have occurred for following reasons.
(1) The crosslink density of a fluorinated elastomer is excessively increased; that is to say, an elastomer is formed into an ebonite material in a manner such that the elastomer is modified in order to improve explosion-proof properties of an explosion-proof elastomer. This results in loss of retraction properties essentially imparted to an elastomer.
(2) The amount of gas absorption in an elastomer is suppressed in order to improve explosion-proof properties. Specifically, the composition of an elastomer is modified such that the polymer fraction is lowered (the polymer fraction is lowered in a mixed composition). Such modification is considered to result in impairment of the elastomer characteristics, leading to deterioration in sag resistance.
(3) A fluorinated elastomer is essentially inferior in low-temperature properties. In addition, low-temperature properties deteriorate as a result of the modifications described in (1) and (2) above.

DISCLOSURE OF THE INVENTION

It is considered that the amount of gas absorption in an elastomer is suppressed (specifically, the polymer fraction is lowered in a mixed composition) in order to attempt to improve the explosion-proof durability (durability under variable pressures of high-pressure hydrogen gas) of a variety of elastomers. However, this results in deterioration of sag resistance, and thus desired performance improvement cannot be achieved.

In addition, the temperature limit at which a conventional elastomer can exhibit low temperature sag resistance (low-temperature retraction rate) is approximately −45° C. Thus, it has been difficult to realize the temperature of −60° C. or less that is required for performance improvement.

Further, a probable candidate elastomer for performance improvement in terms of both of the above desired properties is a silicone elastomer. However, in view of performance improvement in terms of explosion-proof durability, general silicone elastomers lack strength and physical properties, which is very problematic.

As described above, for a high-pressure hydrogen container (CHG tank) system for fuel-cell vehicles, sealing with the use of elastomer is desired in view of degree of freedom of sealing material design. However, an explosion-proof fluorinated elastomer, which is a conventional elastomer sealing material, is problematic in terms of the large increase in "sag amount (compression permanent set)" of such elastomer caused by repetition of filling and discharge of high-pressure hydrogen, in addition to changes in appearance due to expansion, foaming, and the like.

That is to say, in order to seal a high-pressure hydrogen container (CHG tank) system for fuel cell vehicles with an elastomer, the elastomer should have (1): excellent durability in a variable pressure environment of high-pressure hydrogen; and (2): excellent sag resistance in low-temperature to high-temperature environments, which are the significant technical objectives. Thus, it is an objective of the present invention to provide an elastomer that is excellent in terms of both technical objectives described above.

Specifically, it is an objective of the present invention to achieve (1): a range of pressure variation (ΔP) of high-pressure hydrogen gas that is increased to twice or more the conventional range. That is, it is a goal to achieve a range of pressure variation (ΔP) expressed as "ΔP=70 MPa (0⇔70 MPa)," while the conventional range of pressure variation is expressed as "ΔP=30 MPa (0⇔30 MPa)." It is another objective of the present invention to secure (2): low temperature sag resistance (sealing properties) at −60° C. or less.

The present inventors have found that the above objectives can be achieved by using an elastomer having a particular structure and excellent gas diffusivity as a sealing material for a high-pressure hydrogen container. This has led to the completion of the present invention.

Specifically, as shown in FIG. 3, in a first aspect, the present invention concerns a sealing material 104 for a high-pressure hydrogen container 103, which mainly comprises a silicone rubber composed of a dimethyl siloxane segment, a methyl vinyl siloxane segment, and a diphenyl siloxane segment.

The sealing material 104 for a high-pressure hydrogen container 103 of the present invention may comprise the above silicone rubber alone or a mixture of the silicone rubber and a different elastomer. A preferred example of the sealing material 104 is a mixture mainly comprising the silicone rubber and containing mixed therein at least one member selected from the group consisting of ethylene propylene diene rubber (EPDM), ethylene propylene rubber (EPM), natural rubber (NR), isoprene rubber (IR), and nitrile isoprene rubber (NIR).

The sealing material 104 for a high-pressure hydrogen container 103 of the present invention has physical properties of having a tear strength specified in JIS K6252 of 35 N/mm or more at room temperature (23° C.) and 27 N/mm or more at 90° C. and a TR10 measured by a low-temperature retraction test according to JIS K6261 of −60° C. or less.

In a second aspect, as shown in FIG. 3, the present invention concerns a high-pressure hydrogen container 103 that is loaded with high-pressure hydrogen, in which a sealing material 104 mainly comprising a silicone rubber composed of a dimethyl siloxane segment, a methyl vinyl siloxane segment, and a diphenyl siloxane segment is used.

As described above, an example of a sealing material 104 used for the high-pressure hydrogen container 103 of the present invention mainly comprises the above silicone rubber and contains mixed therein at least one member selected from the group consisting of ethylene propylene diene rubber (EPDM), ethylene propylene rubber (EPM), natural rubber (NR), isoprene rubber (IR), and nitrile isoprene rubber (NIR). In addition, the sealing material has physical properties of having a tear strength specified in JIS K6252 of 35 N/mm or more at room temperature (23° C.) and 27 N/mm or more at 90° C. and a TR10 measured by a low-temperature retraction test according to JIS K6261 of −60° C. or less.

In a third aspect, as shown in FIG. 3, the present invention is characterized in that the above high-pressure hydrogen container 103 is a high-pressure hydrogen container used as a vehicular container for supplying hydrogen to fuel cells in a fuel cell vehicle.

The sealing material 104 for a high-pressure hydrogen container 103 of the present invention is a material exhibiting (1): durable performance in variable pressure environments of high-pressure hydrogen in a range of pressure variation (ΔP) of 70 MPa or more; and (2): performance that is much superior to that of a conventional explosion-proof elastomer in terms of "sag resistance" in variable environments including low temperature environments at −60° C. or less. In particular, it is a high-strength sealing material that is obtained without significant impairment of the low-temperature properties. The high-pressure hydrogen container 103 of the present invention for which the above sealing material 104 is used is excellent in terms of durability and is particularly suitable as a high-pressure hydrogen container for fuel cell vehicles.

BEST MODE FOR CARRYING OUT THE INVENTION

Figure 1:
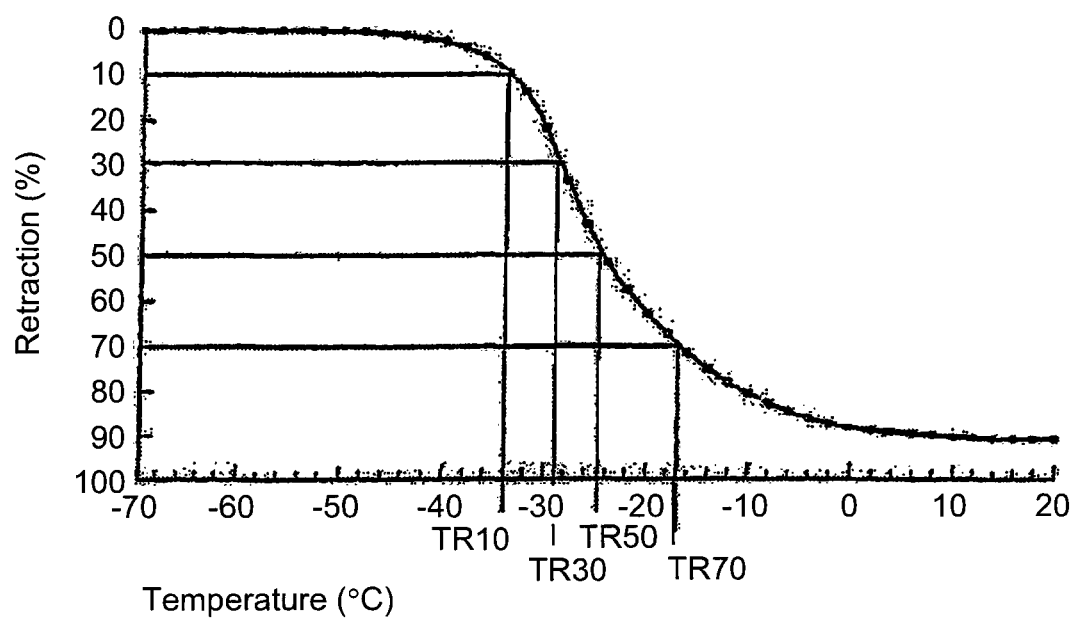
FIG. 1 shows an example of retraction-temperature curve data.

The tests described below were carried out with the use of helium gas as a pressure medium for the tests instead of hydrogen gas, which is an actual medium. This is because, among other similar gases, helium gas is most similar to hydrogen gas in terms of gas characteristics such as diffusivity and permeability.

1. Materials Used in the Example and the Comparative Example and Basic Physical Properties Thereof.

As the sealing material (Example) of the present invention, a polysiloxane derivative represented by the following chemical formula (1) was used. The polysiloxane derivative represented by the chemical formula (1) is a silicone rubber composed of a dimethyl siloxane segment, a methyl vinyl siloxane segment, and a diphenyl siloxane segment.

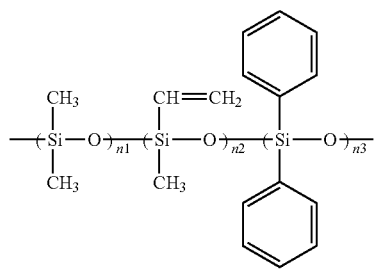

As a conventional sealing material (Comparative Example), a polysiloxane derivative represented by the following chemical formula (2) was used. The polysiloxane derivative represented by the chemical formula (2) is a silicone rubber composed of a dimethyl siloxane segment and a methyl vinyl siloxane segment.

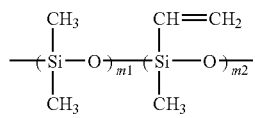

The Example material and the Comparative example materials are compared in table 1 below in terms of specifications of the materials and elastomer basic physical properties. Herein, the measurement results of elastomer basic physical properties were obtained with the use of the following test piece by the following measurement method.
Physical properties: Hardness was measured with a micro rubber hardness meter.
Tear strength: The strength was measured by a test according to JIS K 6252 with the use of unnicked angle test pieces as test pieces.
Low-temperature properties: Determination tests were carried out based on the low-temperature retraction test according to JIS K6261.

TABLE 1

| Classification/ material specification | Elastomer basic physical properties | | | |
|---|---|---|---|---|
| | Hardness (°) | Tear strength (N/mm) 23° C. | 90° C. | Low-temperature properties TR10 (° C.) |
| Example material | 75 | 39.5 | 30.2 | <−75 |
| Comparative Example material | 80 | 17.1 | 14.3 | <−75 |

2. Variable Pressure Durability Test with High-Pressure Gas

An elastomer (O-ring test piece) was exposed to a high-pressure helium environment under predetermined conditions and then subjected to rapid depressurization to 0 MPa. Then, pressure alternation (0⇔70 MPa) was carried out at a predetermined speed. O-ring test pieces were examined according to need in terms of gas tightness and appearance (e.g., foaming state). Variable pressure durability was confirmed by an acceleration test. The test procedures used herein are as follows.
(1) Test piece condition: A test piece is compressed by 20% with a compression board of SUS and then subjected to the test.
(2) Helium gas exposure conditions: The test piece is allowed to stand in 70-MPa helium gas at 80° C. for 1 hour.
(3) Depressurization rate: Rapid depressurization is carried out at a rate at which depressurization release from 70 MPa to 0 MPa is completed in 3 seconds.
(4) Alternation conditions: Pressurization to 70 MPa within 2 seconds and depressurization to 0 MPa within 3 seconds are alternately repeated 20 times.
(5) Durability cycles: A test with a cycle comprising (2), (3), and (4) above is repeated until cracks are generated due to foaming.
[Items for Confirmation and Evaluation]
(1) Confirmation of airtightness: On the day after the variable pressure durability test with high-pressure gas, airtightness is confirmed by a submerged-tube method at normal temperature and at 70 MPa for a retention time of 1 minute.
(2) Appearance examination: the O-ring surface is visually checked after depressurization as to whether or not it has cracks (the O-ring is checked while it is attached to a jig).
[Results for the Variable Pressure Durability Test with High-Pressure Gas]
Table 2 below lists evaluation results regarding cracks due to foaming and external leakage.

TABLE 2

| Classification/ material specification | Final cycle number | O-ring appearance condition | External gas leakage condition |
|---|---|---|---|
| Example material | Pressure alternation: 2000 times or more | No cracks due to foaming (slight expansion confirmed) | No external gas leakage |
| Comparative Example material | Pressure alternation: 680 times | Cracks generated due to foaming | External gas leakage confirmed |

Based on the results shown in table 2, it is understood that the high-strength silicone material used as the Example material is obviously superior to the general silicone material in terms of durability under variable pressures of high-pressure gas.
3. Evaluation of Low-Temperature Properties There are different performance evaluation test methods for elastomer in low temperature environments according to JIS K6261. Herein, an evaluation test was carried out by a method based on the low temperature retraction test (TR test) selected from among the above methods.

The outline of low-temperature retraction test (TR test) is described below. A reed-shaped test piece having a thickness of approximately 2 mm is extended so as to have a predetermined length, followed by freezing at low temperatures. Then, the temperature at which retraction of the test piece is induced as a result of temperature increase such that the constant retraction is obtained is measured for evaluation of low-temperature properties.

FIG. 1 shows an example of retraction-temperature curve data.

Herein, for test evaluation of the material of the present invention, evaluation of low-temperature properties was carried out by the following method under the following conditions.
Initial extension rate=100%
Evaluation and judgment=TR10 (temperature at which the retraction is 10%)

Table 3 below shows evaluation results for low-temperature properties.

TABLE 3

| Material | Performance item TR10 (° C.) |
|---|---|
| Example material | <−75° C. |
| Comparative Example material | <−75° C. |

Based on the results shown in table 3, it is understood that the high-strength silicone material used as the Example material of the present invention has low-temperature properties comparable to those of the general silicone material used as the conventional material and is excellent in low-temperature properties. Specifically, the improvement in terms of high strength has been achieved without the impairment of the low-temperature resistance that is a main feature of silicone rubber.

4. Evaluation of Low-Temperature Sealing Performance

The elastomer (the above O-ring test piece) was exposed under given conditions in a high-pressure helium gas environment for evaluation of the limit for low-temperature sealing.

Figure 2:
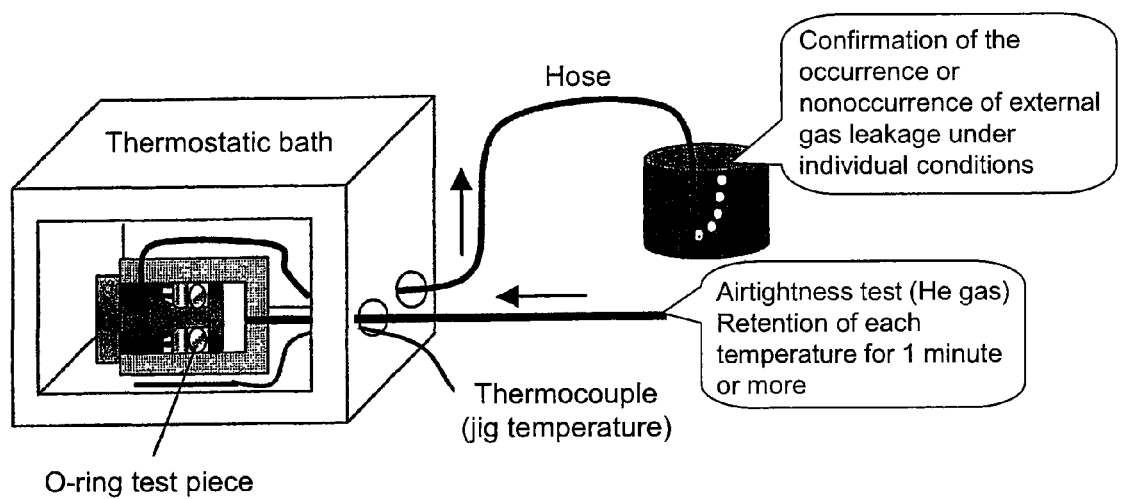
FIG. 2 shows an outline of a low-temperature sealing performance evaluation test.
Figure 3:
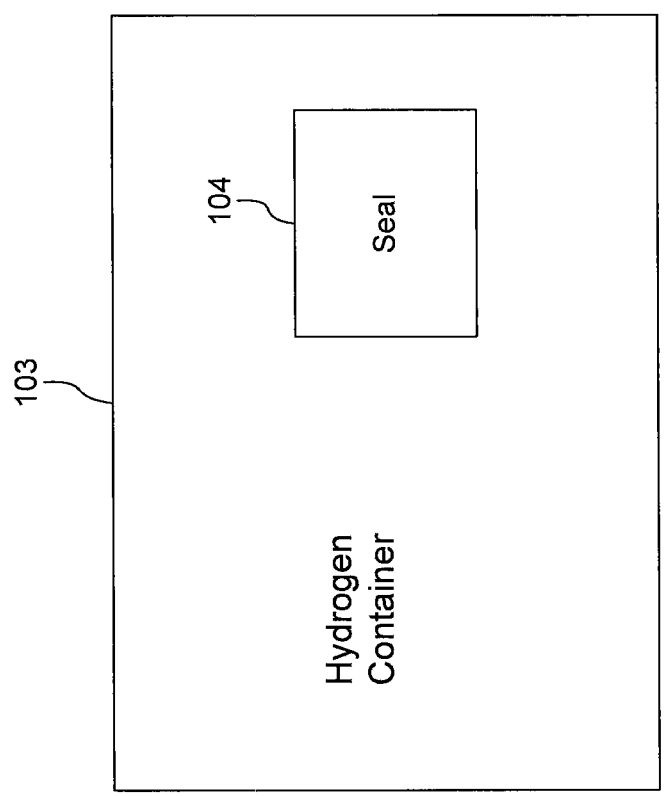
FIG. 3 shows a plan view of a high-pressure hydrogen container with a sealing material.

Test conditions are as described below. FIG. 2 shows an outline of a low-temperature sealing performance evaluation test.

(1) Test piece condition: A test piece is compressed by 20% with a compression board of SUS and then subjected to the test.

(2) Variable pressure condition: The temperature is reduced from −30° C. to −60° C. at −5° C. intervals at a constant pressure of 70 MPa.

(3) Confirmation of airtightness: Each temperature condition in (2) above is retained for 1 minute or more and the temperature is decreased until external gas leakage takes place.

Table 4 below shows evaluation results for low temperature sealing properties.

TABLE 4

| Material | Performance item Conditions for the occurrence of initial gas leakage |
|---|---|
| Example material | No external gas leakage even at −65° C. (limit temperature of thermostatic bath) |
| Comparative Example material | No external gas leakage even at −65° C. (limit temperature of thermostatic bath) |

The results shown in table 4 indicate that the improved high strength silicone material used as the Example material of the present invention has excellent performance comparable to that of the general silicone material used as the conventional material, as indicated by the evaluation results for low-temperature properties of the material test pieces in the above table 3. Specifically, the evaluation results revealed that the improvement in terms of high strength has been achieved without the impairment of the low-temperature resistance that is a main feature of silicone rubber.

5. Evaluation of Temperature Dependence of Strength

Test pieces (unnicked angle test pieces) for a tear strength test were exposed in an arbitrary temperature environment. Then, temperature dependence of tear strength was evaluated in the same temperature environment. The tear test was carried out according to JIS K6252.

Table 5 below lists evaluation results for temperature dependence of strength.

TABLE 5

| Material | Performance item Tear strength (N/mm) | |
|---|---|---|
| | 23° C. | 90° C. |
| Example material | 39.5 | 30.2 |
| Comparative Example material | 17.1 | 14.3 |

Based on the results shown in table 5, it is possible to confirm that a decrease in the tear strength of the high-strength silicone material used as the Example material of the present invention is small even in a high temperature environment as in the case of the general silicone material, indicating that the material of the present invention maintains the low temperature dependence that is a characteristic of silicone rubber.

As a result, the high-strength silicone material used as the Example material of the present invention has (1): excellent durability in a variable pressure environment of high-pressure hydrogen; and (2): excellent sag resistance in low-temperature to high-temperature environments. Thus, it is superior to the general silicone material. The significant technical objectives (1) and (2) have been achieved by the Example material of the present invention in order to seal a high-pressure hydrogen container (CHG tank) system for fuel cell vehicles with an elastomer.

INDUSTRIAL APPLICABILITY

The high-pressure hydrogen container of the present invention is excellent in duration performance in variable pressure environments, and it is also excellent in "sag resistance" in high-temperature to low-temperature environments. In particular, such high-pressure hydrogen container is a highly suitable high-pressure hydrogen container for fuel-cell vehicles. The high-pressure hydrogen container of the present invention contributes to practical and widespread use of fuel-cell vehicles.

The invention claimed is:

1. A sealing material for a high-pressure hydrogen container, which mainly comprises a silicone rubber composed of a dimethyl siloxane segment, a methyl vinyl siloxane segment, and a diphenyl siloxane segment,
wherein the sealing material has a tear strength specified in JIS K6252 of 35 N/mm or more at room temperature (23° C.) and 27 N/mm or more at 90° C., and has a TR10 measured by a low-temperature retraction test according to JIS K6261 of −60° C. or less, and
wherein the sealing material contains mixed therein at least one member selected from the group of ethylene propylene diene rubber, ethylene propylene rubber, natural rubber, isoprene rubber, and nitrile isoprene rubber.

2. A high-pressure hydrogen container that is loaded with high-pressure hydrogen, in which a sealing material mainly comprising a silicone rubber composed of a dimethyl siloxane segment, a methyl vinyl siloxane segment, and a diphenyl siloxane segment is used,
wherein the sealing material has a tear strength specified in JIS K6252 of 35 N/mm or more at room temperature (23° C.) and 27 N/mm or more at 90° C., and has a TR10 measured by a low-temperature retraction test according to JIS K6261 of −60° C. or less, and
wherein the sealing material contains mixed therein at least one member selected from the group consisting of ethylene propylene diene rubber, ethylene propylene rubber, natural rubber, isoprene rubber, and nitrile isoprene rubber.

3. The high-pressure hydrogen container according to claim 2, wherein the container is a high-pressure hydrogen container used as a vehicular container for supplying hydrogen to fuel cells in a fuel cell vehicle.

4. The sealing material for a high-pressure hydrogen container according to claim 1, wherein the silicone rubber consists of the dimethyl siloxane segment, the methyl vinyl siloxane segment, and the diphenyl siloxane segment.

5. The high-pressure hydrogen container according to claim 2, wherein the silicone rubber consists of the dimethyl siloxane segment, the methyl vinyl siloxane segment, and the diphenyl siloxane segment.

* * * * *